United States Patent [19]

McKinney

[11] Patent Number: 4,910,065
[45] Date of Patent: Mar. 20, 1990

[54] REINFORCED HONEYCOMB CORE SANDWICH PANELS AND METHOD FOR MAKING SAME

[75] Inventor: Maurice E. McKinney, Bellevue, Wash.

[73] Assignee: The Boeing Company, Seattle, Wash.

[21] Appl. No.: 109,729

[22] Filed: Oct. 15, 1987

[51] Int. Cl.⁴ ............................................. B32B 3/12
[52] U.S. Cl. .................... 428/116; 156/182; 156/292; 244/117 R
[58] Field of Search ................ 428/116, 118; 156/182, 156/292; 244/117 R, 133

[56] References Cited

U.S. PATENT DOCUMENTS

| | | | |
|---|---|---|---|
| 3,902,732 | 9/1975 | Fosha, Jr. et al. | 428/116 X |
| 4,254,171 | 3/1981 | Beggs et al. | 156/182 X |
| 4,256,790 | 3/1981 | Lackman et al. | 428/116 X |
| 4,331,495 | 5/1982 | Lackman et al. | 428/119 X |
| 4,344,995 | 8/1982 | Hammer | 428/119 X |
| 4,395,450 | 7/1983 | Whitener | 428/119 X |
| 4,565,595 | 1/1986 | Whitener | 156/182 X |
| 4,566,237 | 1/1986 | Turner | 428/116 X |
| 4,599,255 | 7/1986 | Anglin et al. | 428/116 X |
| 4,662,587 | 5/1987 | Whitener | 244/117 R |
| 4,671,470 | 6/1987 | Jonas | 428/116 X |
| 4,735,841 | 4/1988 | Sourdet | 156/292 X |

Primary Examiner—Henry F. Epstein
Attorney, Agent, or Firm—Seed and Berry

[57] ABSTRACT

The composite structural panel has bottom, top and edge layers which enclose a primary core. The core provides additional structural strength to the panel. The edge layer forms a desired panel edge angle of approximately 20° to 45°. The primary core is trimmed at an angle of approximately one-half the desired edge angle to form a first pressure reaction surface. A peripheral core is positioned on the tapered portion of the primary core so that the axis of the peripheral core is perpendicular to the first pressure reaction surface. The peripheral core is trimmed to form a second pressure reaction surface beneath the edge of the panel. The structure is lightweight and resists deformation of the panel edge when the panel is cured under elevated pressure in an autoclave.

13 Claims, 1 Drawing Sheet

REINFORCED HONEYCOMB CORE SANDWICH PANELS AND METHOD FOR MAKING SAME

Statement of Government Interest

The United States Government has rights in this invention.

TECHNICAL FIELD

The invention relates to techniques for constructing composite material structural panels having reinforcing cores. More specifically, the invention relates to construction techniques for improving core resistance to edge deformation during autoclave curing processes.

BACKGROUND ART

Structural panels having reinforcing cores are used in a variety of applications in the aerospace industry. Reinforcing cores are often necessary in large panels to provide sufficient rigidity and structural strength in the panel so that the panel can withstand substantial loading.

Typical panels have a bottom composite layer manufactured from a fibrous material which is impregnated with a resin. A core material of amorphous foam or honeycomb structure is then positioned on the bottom layer. A top composite layer is then bonded to the core. An edge layer is then applied to connect the top and bottom layers and to seal the core therebetween. This assembly is then cured in an autoclave at elevated temperatures and pressures.

The reinforcing core is typically designed to have substantial compression resistance along a core axis. The core is typically oriented with respect to the top and bottom layers so that the core axis is perpendicular thereto. In this way, the structural panel undergoes loading in a fashion similar to a beam wherein the top and bottom layers correspond to the flange portions of a beam and the core corresponds to the web portion of a beam. The core itself has little resistance to compression in a direction perpendicular to the core axis. Thus, the edges of the core are particularly susceptible to deformation when the panels are autoclaved.

A number of construction techniques have been adopted to prevent deformation of the core edges when the panel is autoclaved. In one technique, a peripheral edge material having substantial rigidity in a direction both parallel to and perpendicular to the core axis is positioned around the periphery of the core. In this way, pressure exerted on the edge of the panel is not transferred to the core. This method disadvantageously increases the weight of the panel.

In another technique shown in FIG. 5 of U.S. Pat. No. 4,256,790 issued to Lackman et al., the periphery of the core is tapered at an angle of less than approximately 20°. The top layer of composite material covers this tapered core portion and provides a pressure surface which forms an acute angle with respect to the core axes of at least 70°. It has been found that for many core materials, under typical autoclave pressure, the core will not crush if the pressure surface which transfers force to the core forms an angle of at least 70° to 90° with respect to the core axis. This technique incurs no weight penalty whatsoever and prevents the core edges from being crushed during autoclaving. However, this technique is disadvantageous if the core has a thickness substantially greater than one inch. For example, if the core has a thickness of approximately four inches, the tapered section will have a length of approximately twelve inches. This may be particularly inconvenient if fittings such as latches, hinges, etc. are to be attached to the panel edges.

Therefore, it is desirable for assembly purposes that tapered structural panels have edges which taper at relatively steep angles. Various prior art techniques are available to achieve steeper edged taper angles. In one technique doubler layers are interpositioned within the top and bottom layers adjacent to the tapered core portion to increase the rigidity of the core edges. In another technique, a denser core material is used on the taper periphery of the panel. In yet another technique the tapered core portion is filled with a potting material. Each of these techniques involves a weight penalty which is undesirable.

Therefore, a need exists for a structural panel construction technique which permits relatively steep taper angles on the edges of a structural panel and which does not substantially increase the weight of the panel.

DISCLOSURE OF THE INVENTION

It is an object of the present invention to provide a structural panel which has a relatively steeply tapered edge.

It is a further object of the invention to achieve the above object without substantially increasing the weight of the panel.

It is yet another object of the present invention to achieve the above two objects while providing substantial lateral compression resistance to edges of the panel.

The invention achieves these and other objects, by providing a structural panel having a tapered primary core and a tapered peripheral core. The primary and peripheral cores have substantial compression resistance along respective core axes and substantially less compression resistance in a direction perpendicular to the core axis.

The primary core is tapered so as to define a first peripheral pressure surface on the primary core which forms a first acute angle with respect to a primary core axis. The first acute angle is larger than a predetermined, primary core critical angle at which autoclave pressures would crush the core. The peripheral core is connected to the first peripheral pressure surface on the primary core. The peripheral core is oriented with respect to the primary core so that the peripheral core axis is substantially perpendicular to the first peripheral pressure surface on the primary core. The peripheral core is also tapered and forms a second peripheral pressure surface at a second acute angle with respect to the peripheral core axis. The second acute angle is also greater than a predetermined, peripheral core critical angle at which autoclave pressure on the peripheral core would crush the peripheral core. The primary and peripheral cores are sandwiched between bottom, top and edge composite layers. The resulting structure has substantial resistance to autoclave pressure induced edge failure of the panel because force is transferred to the core axes at an angle which is greater than critical angles for the cores.

In a preferred embodiment of the invention, a septum is positioned between the primary core and the peripheral core at the first peripheral pressure surface to stabilize the cores. The primary and peripheral core edges are both tapered at edge taper angles between approximately 10° to 22.5°. In this way, the structural panel has a desired edge angle of approximately 20° to 45°. The panel thus constructed is resistant to edge crushing in the autoclave and has a relatively steep edge angle, which is highly desired, especially if the primary core is relatively thick.

More than one peripheral core may be provided. For example, the primary core can be tapered at an edge angle of approximately 15°. Two peripheral cores can be provided having tapered edge angles each of also 15°. The peripheral cores are positioned one on top of the other, and the resulting peripheral core assembly is positioned on the first peripheral pressure surface of the primary core. Thus, a desired edged angle for the panel of approximately 45° is achieved, wherein each core axis forms an acute angle of 75° with respect to an adjacent pressure reaction surface. The resulting structure is light in weight and highly resistant to edge crushing during autoclave curing.

BEST MODE FOR CARRYING OUT THE INVENTION

Figure 1:
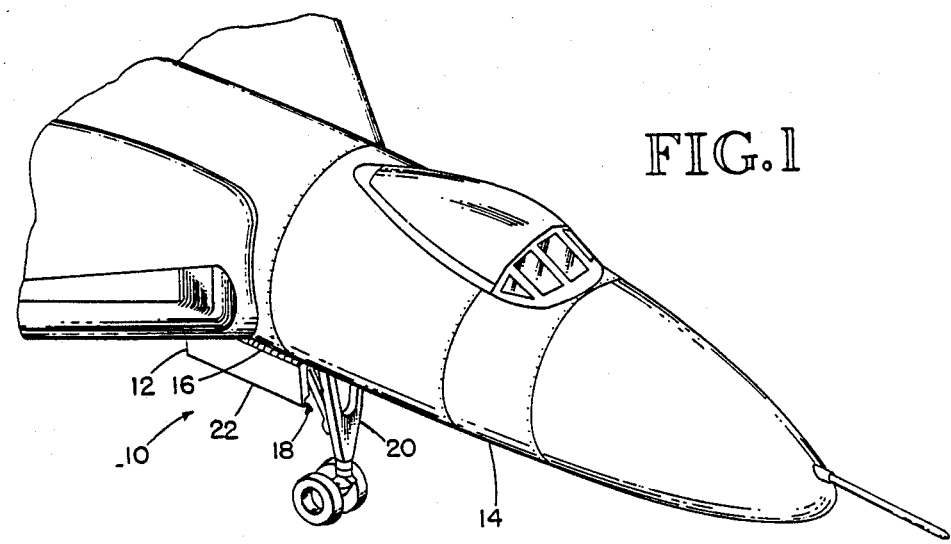
FIG. 1 is an isometric view of a composite structural panel utilized in a landing gear door for an aircraft.

A composite structural panel, made in accordance with the construction technique of the present invention is generally indicated at reference number 10 in the figures. As shown in FIG. 1, the panel 10 can take the form of a landing gear door 12 on an aircraft 14. The landing gear door 12 is pivotally connected to the aircraft 14, such as by hinges 16. The door 12 conceals a cavity 18 in the aircraft 14 which houses the landing gear 20 when the landing gear 20 is retracted. Latches 22 maintain the landing gear door 12 in a closed position under aerodynamic loading.

The composite structural panel 10 is generally of the type which has a bottom layer 24, top layer 26 and edge layer 28 manufactured from a composite material such as a graphite fiber/epoxy resin laminate. The layers surround a core, generally indicated at reference numeral 30 which provides substantial structural strength to the panel 10. The edge layer 28 and bottom layer 24 merged to form a peripheral flange 32. The peripheral flange provides an attachment point for bolts 34 or other fasteners to connect the panel 10 to various fittings, such as the hinges 16 or latches 22. The panel is generally laid up on a forming tool (not shown) before being cured in an autoclave.

The core 30 has substantial compression resistance along a core axis. The preferred core has a honeycomb structure which has substantial resistance to compression along axes of the honeycombs, but which has relatively little compression resistance along a direction perpendicular to the honeycomb axes.

The composite structural panel 10 is cured in an autoclave at an elevated temperature and pressure. As previously stated, the honeycomb core 30 resists compression along the core axis. However, transverse forces tend to crush the core, particularly along edges of the core. Depending on the core material, the core will crush at various different critical angles when subject to a force having a component which is transverse to the core axis. The core may be constructed from aluminum, fiberglass, titanium, nylon or other materials. It has been found, for example, that an aluminum honeycomb core having a height of approximately two inches cannot sustain typical autoclave pressure if the pressure is exerted in a direction more than approximately 20° from the core axis. That is, if the edge of the panel 10 is tapered so that a pressure reaction surface forms an angle less than 70° with respect to the core axis, the edges of the core may collapse when the structural panel is cured in an autoclave. As previously stated, it is desirable in structural panels having relatively thick cores, that the panel have a desired edge taper of between 20° to 45°.

Figure 2:
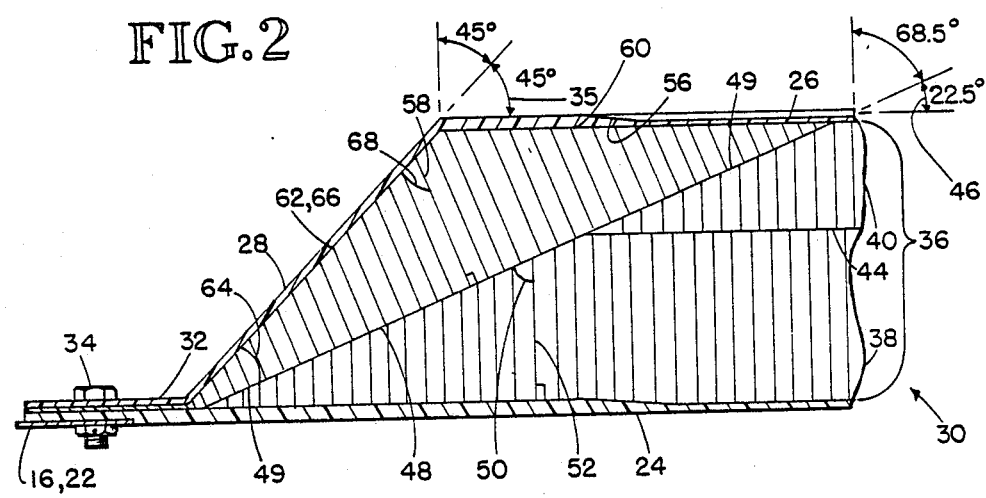
FIG. 2 is an enlarged, sectional, elevational view of a composite structural panel utilizing the edge construction technique of the present invention.

The panel 10 shown in FIG. 2 has a desired panel edge angle 35 of 45°. The panel is provided with a tapered primary core 36 consisting of a lower honeycomb core 38 and an upper honeycomb core 40. A septum 44 of composite material is located between the upper and lower cores 40, 38 to stabilize the primary core 36. The upper and lower cores each have a height of approximately two inches, providing the primary core 36 with a height of approximately four inches.

The primary core 36 has a peripheral edge which is tapered at a primary core taper angle 46 of approximately 22.5° to define a first pressure reaction surface 48. The first pressure reaction surface thus forms a first acute angle 50 of approximately 68.5° with respect to a primary core axis 52. It has been found that the primary core will not deform under conventional autoclave curing pressures as long as the first acute angle 50 exceeds 68.5°.

For certain assembly purposes, it is highly preferred that the structural panel 10 have the panel edge angle 35 of approximately 45°. The core 30 is therefore provided with a peripheral core 56 having peripheral core axes 58 which are perpendicular to the first peripheral pressure reaction surface 48. A peripheral septum 49 provides a foundation for the peripheral core 56 and a means for bonding the peripheral core 56 to the primary core 36.

The peripheral core 56 has an upper edge 60 which is trimmed flush with the upper honeycomb core 40. The peripheral core 56 also has an outer edge 62 which is trimmed at a peripheral core taper angle 64 of approximately 22.5° with respect to the first pressure reaction surface 48 and peripheral septum 49. The outer edge 62 of the peripheral core 56 thus forms a second pressure reaction surface 66 which forms a second acute angle 68 of approximately 68.5° with respect to the peripheral core axes 58. The peripheral core will not deform under conventional autoclave pressures as long as the second acute angle 68 exceeds approximately 68.5°. Therefore, the panel 10 is capable of withstanding autoclave pressures without any substantial deformation of the primary or peripheral cores 36, 56. It is preferred that the primary and peripheral cores 36 and 56 be constructed from the same materials, thus preventing excessive weight from being introduced into the panel 10.

Other embodiments and variations are contemplated. For example, the primary and peripheral core taper angles 46 and 64 need not necessarily be equal to one another and be one-half of the desired panel edge angle 54. Variations may be acceptable so long as the first acute angle 50 and second acute angle 68 for the primary and peripheral cores 36, 56 exceed predetermined critical angles for the core materials. In addition, the technique described above may be applied to structural panels for use wherever a substantially rigid, lightweight panel of this type may be expected to experience substantial loading, either aerodynamic or otherwise. In view of the above, the invention is not to be limited by the above description, but is to be determined in scope by the claims which follow.

I claim:

1. A core structure for reducing autoclave pressure induced edge failure of structural panels of the type having a bottom layer, a top layer, and edge layer and a primary core therebetween, wherein the primary core has substantial compression resistance along a primary core axis comprising:

a primary core having substantial compression resistance along a primary core axis, the primary core axis being positioned substantially perpendicular to a panel bottom layer, the primary core having a peripheral edge defining a first peripheral pressure surface at a first acute angle with respect to the primary core axis; and a peripheral core having substantial structural compression resistance along a peripheral core axis, the peripheral core axis being positioned substantially perpendicular to the first peripheral pressure surface, the peripheral core having a second peripheral pressure surface at a second acute angle with respect to the peripheral core axis, whereby a panel having the primary and peripheral cores can be exposed to elevated pressures during curing without substantial deformation of the cores.

2. The core structure of claim 1 wherein the first and second acute angles are larger than predetermined first and second critical angles for the primary core and peripheral core, respectively, wherein the critical angles are angles at which the cores deform when exposed to a predetermined pressure.

3. The core structure of claim 2 wherein the primary core and peripheral core have substantially similar densities and axial compression resistance and wherein the first and second acute angles are equal.

4. The core structure of claim 3 wherein the first and second acute angles are approximately equal to 70°.

5. The core structure of claim 1 including an edge layer on the second peripheral pressure surface.

6. The core structure of claim 1 including a peripheral septum between the primary core and the peripheral core at the first peripheral pressure surface to stabilize the peripheral core.

7. A structural panel having composite layers which enclose a core, the panel having an edge angled between desired edge angles of approximately 20° to 45°, comprising:

a bottom layer of composite material;

a top layer of composite material;

a primary core having substantially parallel structural members positioned substantially perpendicular to the bottom and top layers, the primary core having a peripheral portion tapered at a first taper angle of approximately one half of a desired edge angle with respect to the bottom layer;

a peripheral core portion connected to the primary core tapered portion, the peripheral portion having substantially parallel structural members positioned at an obtuse angle of approximately 180° less the first taper angle with respect to the structural members of the primary core, the peripheral core portion being tapered at a second taper angle of approximately one half of the desired edge angle with respect to the primary core's peripheral portion; and an edge layer of composite material on the tapered portion of the peripheral core, whereby the structural panel is enclosed by the layers and is resistant to edge deformation when cured in an autoclave at an elevated pressure.

8. The structural panel of claim 7 including a septum between the peripheral core portion and the primary core.

9. The structural panel of claim 7 wherein the primary core has a thickness of approximately four inches and wherein the first and second taper angles are approximately 20°.

10. A method for forming a composite structural panel of the type having a bottom composite layer, a top composite layer, an edge composite layer and a core material therebetween, comprising the steps of:

placing a bottom layer on a forming tool;

placing a primary core having substantial compression resistance along a primary core axis on the bottom layer so that the primary core axis is substantially perpendicular to the bottom layer;

tapering a peripheral portion of the primary core to form a first peripheral pressure surface at a first acute angle with respect to the primary core axis;

placing a peripheral core having substantial compression resistance along a peripheral core axis on the first peripheral pressure surface so that the peripheral core axis is substantially perpendicular thereto;

tapering the peripheral core to form a second peripheral pressure surface at a second acute angle with respect to the peripheral core axis;

placing a top layer on the primary core;

placing an edge layer on the second peripheral pressure surface, whereby the primary and peripheral cores are enclosed by the top, bottom and edge layers; and processing the assembled layers and cores at elevated pressure and temperatures sufficient to cure the layers and form a substantially rigid, composite structural panel without deforming the cores.

11. The method of claim 10 wherein the first and second acute angles are greater than approximately 70°.

12. The method of claim 10 wherein the first and second acute angles are larger than predetermined first and second critical angles for the primary core and peripheral core, respectively, wherein the critical angles are angles at which the cores deform when exposed to a predetermined pressure.

13. The method of claim 10 wherein after the primary core tapering step and before the peripheral core positioning step a septum is positioned on the first peripheral pressure surface.

* * * * *